US009853672B2

(12) United States Patent
Ko et al.

(10) Patent No.: US 9,853,672 B2
(45) Date of Patent: Dec. 26, 2017

(54) MOBILE TERMINAL (71) Applicant: LG ELECTRONICS INC., Seoul (KR)

(72) Inventors: Dongseuck Ko, Seoul (KR); Dongchoon Kim, Seoul (KR); Eunseok Choi, Seoul (KR); Jonghun Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/553,889

(22) Filed: Nov. 25, 2014

(65) Prior Publication Data
US 2015/0280763 A1 Oct. 1, 2015

(30) Foreign Application Priority Data
Mar. 25, 2014 (KR) .................. 10-2014-0034829

(51) Int. Cl.
*H04B 1/3827* (2015.01)
*G06F 1/16* (2006.01)
(Continued)

(52) U.S. Cl.
CPC ......... *H04B 1/385* (2013.01); *G02B 27/0176* (2013.01); *G06F 1/163* (2013.01);
(Continued)

(58) Field of Classification Search
CPC ............ H04B 1/385; H04B 2001/3855; H04B 2001/3866; G06F 3/011; G06F 1/163;
(Continued)

(56) References Cited

U.S. PATENT DOCUMENTS

| 7,438,410 | B1 * | 10/2008 | Howell | G02C 11/00 351/158 |
|---|---|---|---|---|
| 2002/0090099 | A1 * | 7/2002 | Hwang | H04M 1/05 381/312 |
| 2009/0026839 | A1 * | 1/2009 | Drageset | G06F 1/263 307/32 |
| 2013/0147836 | A1 * | 6/2013 | Small | G06F 3/011 345/633 |

(Continued)

FOREIGN PATENT DOCUMENTS

WO  2008/088691  7/2008

OTHER PUBLICATIONS

European Patent Office Application Serial No. 14194952.9, Search Report dated Oct. 13, 2015, 8 pages.

*Primary Examiner* — Andrew Wendell
*Assistant Examiner* — Maryam Soltanzadeh
(74) *Attorney, Agent, or Firm* — Lee, Hong, Degerman, Kang & Waimey (57) ABSTRACT

Disclosed is a mobile terminal having a differentiated structure from the conventional one. The mobile terminal includes a neck band unit configured to be wearable on a user's neck, and having a main power supply unit; and a glass unit having a frame configured to be wearable on a user's head, having an input/output module installed at the frame, and electrically-connectable to the neck band unit so as to be provided with power from the main power supply unit, wherein the neck band unit is provided with accommodation recesses formed such that at least part thereof corresponds to the frame, and wherein the glass unit is coupled to the neck band unit when two ends thereof are inserted into the accommodation recesses, respectively, and wherein the glass unit is separated from the neck band unit when the two ends thereof are withdrawn from the accommodation recesses, respectively.

18 Claims, 10 Drawing Sheets (51) Int. Cl.
*H04M 1/05* (2006.01)
*G02B 27/01* (2006.01)
*G06F 3/01* (2006.01)
H04M 1/02 (2006.01)
H04M 1/04 (2006.01)
H02J 7/02 (2016.01)
H02J 7/04 (2006.01)
H02J 50/10 (2016.01)

(52) U.S. Cl.
CPC ............... *G06F 3/011* (2013.01); *H04M 1/05* (2013.01); *G02B 2027/0138* (2013.01); *H02J 7/025* (2013.01); *H02J 7/042* (2013.01); *H02J 50/10* (2016.02); *H04B 2001/3855* (2013.01); *H04B 2001/3861* (2013.01); *H04B 2001/3866* (2013.01); *H04M 1/0254* (2013.01); *H04M 1/04* (2013.01); *H04M 2250/12* (2013.01)

(58) Field of Classification Search
CPC ......... G02B 27/0176; G02B 2027/0138; H02J 7/025; H02J 50/10; H04M 2250/12; H04M 1/05; H04M 1/04; H04M 1/0254
See application file for complete search history.

(56) References Cited

U.S. PATENT DOCUMENTS

| | | | |
|---|---|---|---|
| 2013/0235331 A1* | 9/2013 | Heinrich | G02C 11/10 351/158 |
| 2013/0293577 A1 | 11/2013 | Perez et al. | |
| 2014/0152696 A1* | 6/2014 | Jung | G06F 3/011 345/633 |
| 2015/0016035 A1* | 1/2015 | Tussy | G06F 1/1635 361/679.03 |
| 2015/0268475 A1* | 9/2015 | Lee | G06F 1/163 345/8 |

\* cited by examiner

MOBILE TERMINAL

CROSS-REFERENCE TO RELATED APPLICATION

Pursuant to 35 U.S.C. §119(a), this application claims the benefit of earlier filing date and right of priority to Korean Application No. 10-2014-0034829, filed on Mar. 25, 2014, the contents of which is incorporated by reference herein in its entirety.

BACKGROUND OF THE DISCLOSURE

1. Field of the Disclosure

This specification relates to a mobile terminal, and more particularly, a mobile terminal which is wearable on a user's head like glasses.

2. Background of the Disclosure

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Recently, the concept of the mobile terminal extends to a wearable device which can be worn on a user's body, from the conventional one which can be held by a user's hand. An example of such wearable device may be a glass type terminal.

The wearable device is being manufactured by focusing on a small size and a light weight in the industrial world, due to its wearable characteristic on a user's body. According to such recent trend, the industrial world is actively investing in a small and light wearable device. In case of a wearable device manufactured to satisfy all of users' desired functions, the number of components should be increased. This may result in a large size and a heavy weight of the wearable device. On the contrary, in case of a wearable device manufactured by focusing on only a small size and a light weight, utilizable functions are limited. This may cause a user's non-preference.

Considering such characteristics of the wearable device, a new type of wearable device, capable of overcoming the conventional problems, may be provided.

SUMMARY OF THE DISCLOSURE

Therefore, an aspect of the detailed description is to provide a mobile terminal having a differentiated structure from the conventional one.

Another aspect of the detailed description is to provide a mobile terminal having a small size and a light weight.

Another aspect of the detailed description is to provide a mobile terminal capable of extending functions according to a user's selection.

To achieve these and other advantages and in accordance with the purpose of this specification, as embodied and broadly described herein, there is provided a mobile terminal, including: a neck band unit configured to be wearable on a user's neck, and having a main power supply unit; a glass unit having a frame configured to be wearable on a user's head, having an input/output module installed at the frame, and electrically-connectable to the neck band unit so as to be provided with power from the main power supply unit, wherein the neck band unit is provided with accommodation recesses formed such that at least part thereof corresponds to the frame, wherein the glass unit is coupled to the neck band unit when two ends thereof are inserted into the accommodation recesses, respectively, and wherein the glass unit is separated from the neck band unit when the two ends thereof are withdrawn from the accommodation recesses, respectively.

The main power supply unit may occupy a relatively large weight of the mobile terminal. Thus, if the main power supply unit is disposed at the neck band unit, a weight of the glass unit can be reduced, and thus a user's fatigue due to wearing of the glass unit can be reduced.

In an embodiment of the present invention, the glass unit may be provided therein with an auxiliary power supply unit so as to be operable even in a non-electrically connected state with the neck band unit. Once the neck band unit and the glass unit are coupled to each other, the auxiliary power supply unit may be charged with power supplied from the main power supply unit.

Thus, the glass unit can operate independently without receiving power from the main power supply unit of the neck ban unit. The auxiliary power supply unit may be formed to have a smaller capacity than the main power supply unit. Thus, a weight of the glass unit can be minimized. Since the auxiliary power supply unit is charged with power supplied from the main power supply unit, a problem of the glass unit, shortage of power, can be solved in the present invention.

In another embodiment of the present invention, one of the glass unit and the neck band unit may be provided with charging pins, and another of the glass unit and the neck band unit may be provided with charging terminals in correspondence to the charging pins. When the frame is inserted into the accommodation recesses, the charging pins and the charging terminals may come in contact with each other.

In another embodiment of the present invention, the glass unit may further include a camera module installed at the frame. The input/output module and the camera module may be installed at opposite sides based on a central part of the frame, such that a weight of the glass unit is prevented from being distributed to one side.

If the weight of the glass unit is uniformly distributed, a user's fatigue due to wearing of the glass unit can be reduced.

The neck band unit may be provided, at two ends thereof, with a first accommodation portion and a second accommodation portion extending from the accommodation recesses. When the neck band unit and the glass unit are coupled to each other, at least part of the input/output module may be inserted into the first accommodation portion, and at least part of the camera module may be inserted into the second accommodation portion.

The neck band unit may be provided with a connector protruding from the first accommodation portion. The input/output module may be provided with a port corresponding to the connector. When the input/output module is inserted into the first accommodation portion, the connector may be inserted into the port.

In another embodiment of the present invention, the mobile terminal may further include a cable configured to connect the neck band unit and the glass unit to each other in a state where the neck band unit and the glass unit have been separated from each other In another embodiment of the present invention, the neck band unit may be provided with a connector on an outer surface thereof, the outer surface arranged at a rear region of a neck when a user has worn the neck band unit. The glass unit may be provided, at two ends thereof, with terminal portions electrically-connected to the neck band unit through the connector. The connector may be connected to the two terminal portions through a cable branched into two parts from the connector and extending toward the terminal portions.

In another embodiment of the present invention, the neck band unit and the glass unit may be coupled to each other to form an annular terminal body. The glass unit can be carried in a coupled state to the neck band unit worn on a user's neck. Thus, the glass unit can be carried and stored in the neck band unit without an additional case.

The terminal body may be formed to have a length controllable in correspondence to a size of a user's neck or head. In a state where the neck band unit and the glass unit have been separated from each other, each of the neck band unit and the glass unit can have a length prolonged or shortened.

In another embodiment of the present invention, the mobile terminal may further include elastic members installed on inner circumferential surfaces of the accommodation recesses, the elastic members configured to press the frame for prevention of arbitrary separation of the glass unit from the accommodation recesses.

In another embodiment of the present invention, the neck band unit may be provided therein with wireless charging coils for charging the main power supply unit by wirelessly receiving power from an external wireless charger. The main power supply unit may be charged with power supplied from the external wireless charger, and the auxiliary power supply unit may be charged with power supplied from the main power supply unit.

In another embodiment of the present invention, components of the mobile terminal may be mounted to the neck band unit and the glass unit in a distributed manner, for prevention of fatigue concentration onto a specific part of a user's body due to wearing of the mobile terminal. Thus, the degree of fatigue applied to a user can be reduced even if the user has worn the mobile terminal for a long time.

In another embodiment of the present invention, the input/output module may include a display unit disposed in front of a user's eyes, and configured to provide visual information to the user; and a touch input unit extending from the display unit along the frame, and configured to receive a touch input.

In another embodiment of the present invention, the glass unit may be provided with a bio sensor at part of the frame contacting a user's skin, the bio sensor configured to sense a user's bio-signal transmitted through the user's skin.

In another embodiment of the present invention, functions executable in the glass unit may be extended by an electrical connection between the glass unit and the neck band unit. The glass unit may be provided with only a minimized number of functions, whereas the neck band unit may be provided with the rest functions. Thus, when the glass unit and the neck band unit are electrically-connected to each other, functions executable in the glass unit may be extended.

In another embodiment of the present invention, part of the frame, which contacts a user's skin, may be formed of a silicone material. And the rest part of the frame may be formed of a metallic material, so as to function as an antenna.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
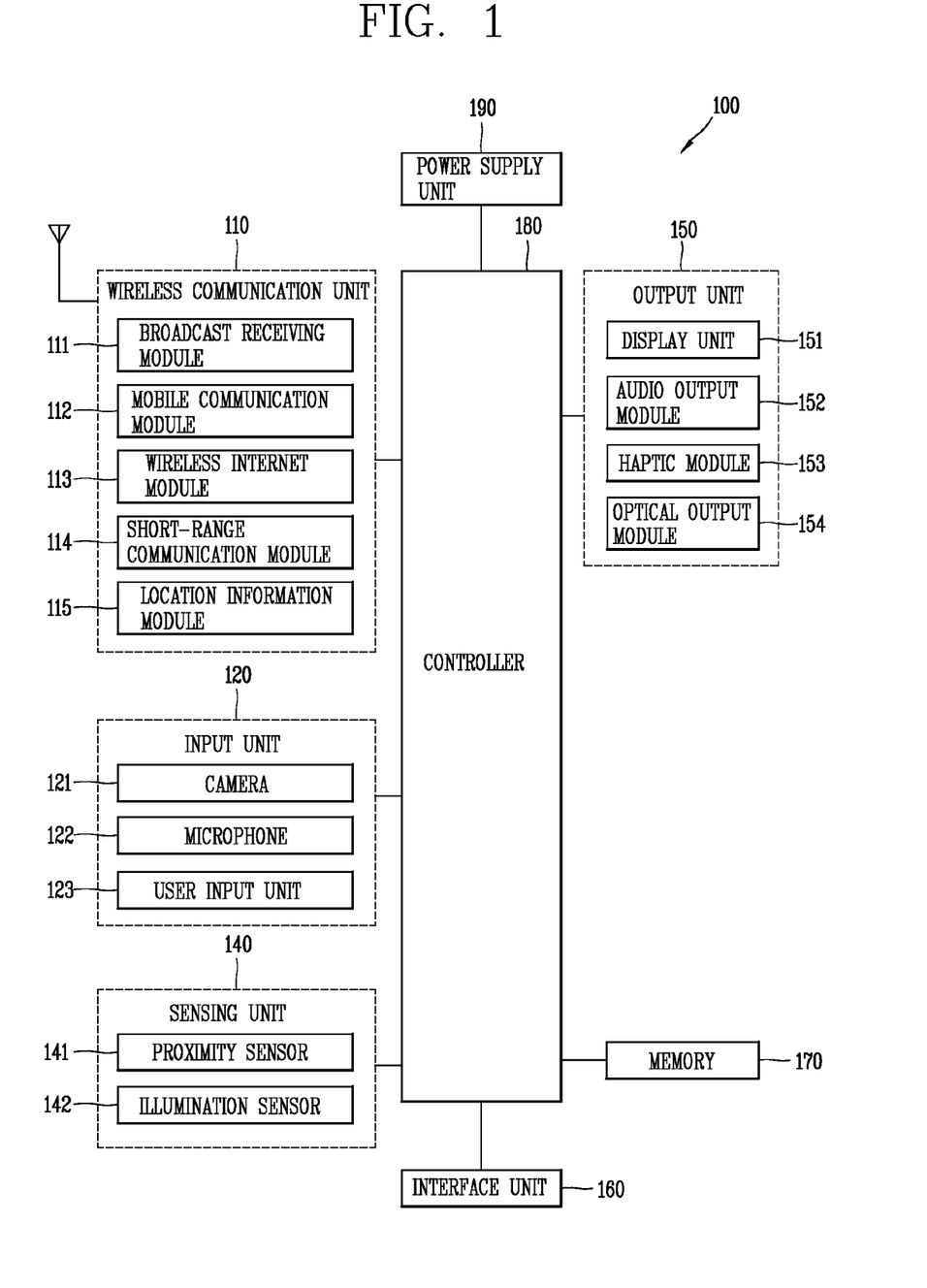
FIG. 1 is a block diagram of a mobile terminal according to an embodiment of the present invention.

FIG. 1 is a block diagram of a mobile terminal 100 according to an embodiment of the present invention.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the above components may cooperate with each other, so as to control an operation of a mobile terminal according to various embodiments to be explained later. A method of controlling a mobile terminal may be implemented on the mobile terminal, by driving at least one application program stored in the memory 170.

A mobile terminal 200 according to the present invention, which has a differentiated structure from the conventional one, will be explained in more detail with reference to FIGS. 2 to 4.

The concept of the mobile terminal 200 may extend to a wearable device which can be worn on a user's body, from the conventional one which can be held by a user's hand. Such wearable device may include a smart watch, a smart glass, a head mounted display (HMD), etc. Hereinafter, the mobile terminal 200 implemented as a wearable device will be explained.

A wearable device may be configured to exchange data with another mobile terminal. The short-range communication module 114 (refer to FIG. 1) can recognize (or sense) a wearable device near the mobile terminal 200 (or 100). In a case where the sensed wearable device has been authenticated to communicate with other mobile terminal, the controller 180 (refer to FIG. 1) may transmit at least part of data processed in other mobile terminal, to the wearable device, through the short-range communication module 114 (refer to FIG. 1). Thus, a user can use data processed in other mobile terminal, using a wearable device. For instance, in a case where a call has been received in other mobile terminal, a user can perform a call using a wearable device. As another example, in a case where a message has been received in other mobile terminal, a user can check the received message through a wearable device.

Figure 2:
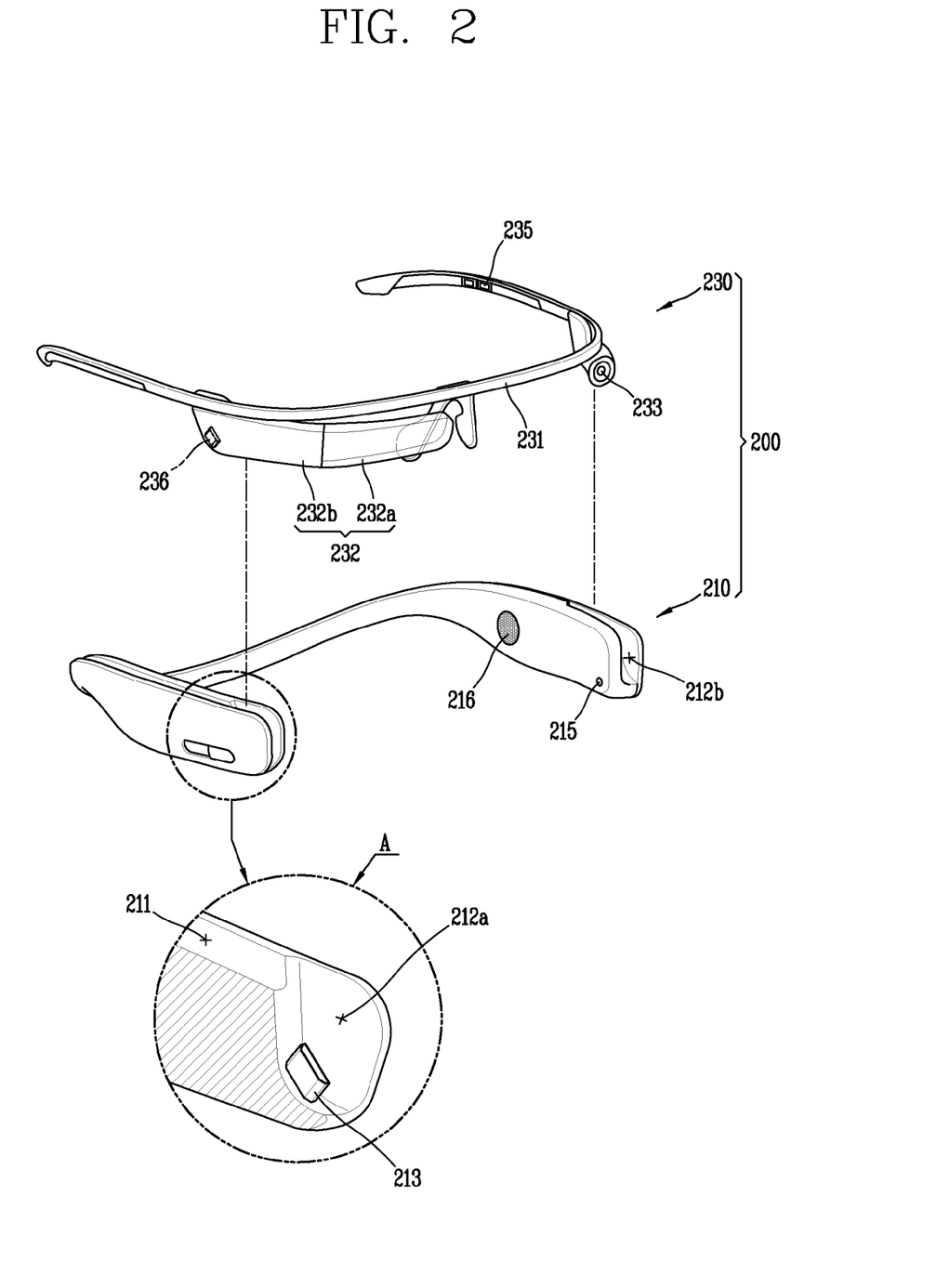
FIG. 2 is a perspective view of a mobile terminal according to an embodiment of the present invention, which shows a neck band unit and a glass unit in a separate manner.

FIG. 2 is a perspective view of a mobile terminal 200 according to an embodiment of the present invention, which shows a neck band unit 210 and a glass unit 230 in a separate manner. FIG. 3 is a planar view of the mobile terminal 200 of FIG. 2, which shows a separated state between the neck band unit 210 and the glass unit 230. FIG. 4 is a perspective view of the mobile terminal 200 of FIG. 2, which shows a coupled state between the neck band unit 210 and the glass unit 230.

The mobile terminal 200 includes the neck band unit 210 worn on a user's neck like a necklace, and the glass unit 230 worn on a user's head like glasses.

The neck band unit 210 is formed to be wearable on a user's neck. As shown in FIG. 2, the neck band unit 210 is formed to have a 'U' shape. The neck band unit 210 may be formed of a flexible material. A user may widen the neck band unit 210, and then may position his or her neck inside the 'U'-shaped neck band unit 210. Then, if the user detaches his or her hand from the neck band unit 210, the neck band unit 210 is restored to the original state. The neck band unit 210 is worn on the user's neck through such processes.

The glass unit 230 is provided with a frame 231 configured to be wearable on a user's head. The frame 231 may be formed in a 'U' shape, which extends from a front surface of a head toward two ears when mounted on the head. However, the present invention is not limited to this. That is, the frame 231 may be formed to have other shape wearable on a user's head. The frame 231 serves as a rim of glasses, substantially. The frame 231 may be formed of a flexible material so that a user can easily wear the glass unit 230.

Part of the frame 231, which contacts a user's skin, may be formed of a silicone material for enhanced wearing sensation. The rest part of the frame 231 may be formed of a metallic material, so as to function as an antenna. At least part of the metallic part may be divided into patterns, so that antennas having various purposes can be implemented.

The glass unit 230 is provided with an input/output module 232 installed at the frame 231. The input/output module 232 includes an input unit and an output unit shown in FIG. 1. The input/output module 232 may include a display unit 232a and a touch input unit 232b. The display unit 232a is disposed in front of a user's eyes, and provides visual information to the user. The touch input unit 232b is configured to receive a touch input. The touch input unit 232b extends from the display unit 232a along the frame 231. The display unit 232a may be arranged on a front surface of a head, and the touch input unit 232b may be arranged on a side surface of a head.

The display unit 232a may project an image to a user's eyes using a prism. The prism may be formed to be transmissive so that a user can see not only a projected image, but also a general view (a range viewable through a user's eyes).

An image output to the display unit 232a may be overlapped with a general view. The glass type terminal 200 may provide an Augmented Reality (AR) configured to overlap a virtual image to a real image or background for a single image.

The glass unit 230 may be further provided with a camera module 233 installed at the frame 231. The camera module 233 is disposed close to at least one of a left eye and a right eye, and is configured to capture a front image. The camera module 233 can obtain a scene at which a user is looking as an image, because it is positioned close to the user's eye.

In the present invention, the input/output module 232 and the camera module 233 may be installed at opposite sides based on a central part of the frame 231, such that a weight of the glass unit 230 is prevented from being distributed to one side. However, the position of the input/output module 232 and the camera module 233 may be variable. For instance, the camera module 233 may be arranged at a central part of the frame 231.

A controller (not shown), configured to control an operation of the glass unit 230, may be mounted in the input/output module 232. The controller may operate the display unit 232a or the camera module 233, based on a user's touch input. The controller may include a micro control unit 215, for instance.

The neck band unit 210 and the glass unit 230 are formed to be coupled to or separated from each other.

The neck band unit 210 is provided with accommodation recesses 211 formed such that at least part thereof corresponds to the frame 231 of the glass unit 230. The glass unit 230 is coupled to the neck band unit 210 as two ends of the frame 231 are inserted into the accommodation recesses 211, respectively. On the contrary, the glass unit 230 is separated from the neck band unit 210 as two ends of the frame 231 are withdrawn from the accommodation recesses 211, respectively. Once the neck band unit 210 and the glass unit 230 are coupled to each other, the mobile terminal 200 is formed to have a single body. On the other hand, once the neck band unit 210 and the glass unit 230 are separated from each other, the mobile terminal 200 is formed to have two bodies.

Figure 3:
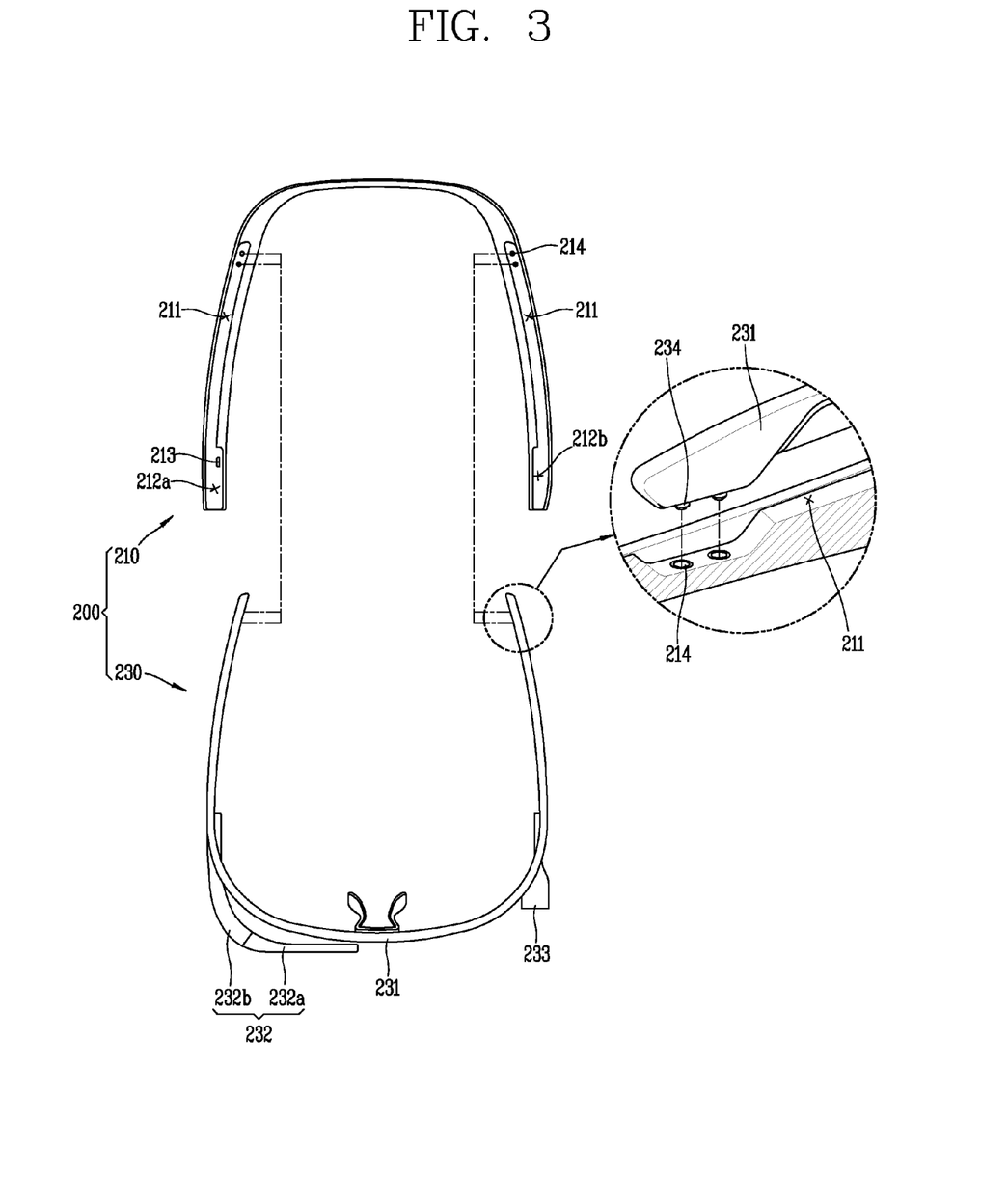
FIG. 3 is a planar view of the mobile terminal of FIG. 2, which shows a separated state between the neck band unit and the glass unit.

FIGS. 2 and 3 are views illustrating the neck band unit 210 and the glass unit 230 separated from each other. The neck band unit 210 and the glass unit 230 are coupled to each other to form an annular terminal body. FIG. 4 is a view illustrating the neck band unit 210 and the glass unit 230 coupled to each other. The terminal body may be formed to have a length controllable (prolonged or shortened) in correspondence to a size of a user's neck or head.

Referring to FIGS. 2 and 3, the neck band unit 210 may be provided, at two ends thereof, with a first accommodation portion 212a and a second accommodation portion 212b extending from the accommodation recesses 211. The first accommodation portion 212a is formed at one end of the neck band unit 210, and the second accommodation portion 212b is formed at another end of the neck band unit 210. As shown in FIG. 4, once the neck band unit 210 and the glass unit 230 are coupled to each other, at least part of the input/output module 232 is inserted into the first accommodation portion 212a, and at least part of the camera module 233 is inserted into the second accommodation portion 212b.

Referring to part 'A' in FIG. 2, the neck band unit 210 is provided with a connector 213 protruding from the first accommodation portion 212a. The input/output module 232 is provided with a port 236 corresponding to the connector 213. Once the input/output module 232 is inserted into the first accommodation portion 212a, the connector 213 is inserted into the port 236 as shown in part 'B' of FIG. 4. The neck band unit 210 and the glass unit 230 may be electrically-connected to each other by the connector 213 and the port 236.

In the present invention, the neck band unit 210 is provided with a main power supply unit (not shown). The main power supply unit is configured to supply power not only to the neck band unit 210, but also to the glass unit 230.

An object of the same weight may be wearable on a head like glasses, or may be wearable on a neck like a necklace. In this case, a user feels less fatigue when he or she has worn the object on the neck. The reason is as follows. An object worn on the neck is supported by the neck and muscles inside shoulders. On the contrary, an object worn on the head like glasses is supported by ears and a nose.

Considering that, in the present invention, the main power supply unit having a large weight of an entire weight of the mobile terminal 200 is arranged in the neck band unit 210, for a user's reduced fatigue. The neck band unit 210 does not cause inconvenience in using the mobile terminal 200, even if it has a larger size and a heavier weight than the glass unit 230, because it is worn on the neck. Thus, a user's degree of fatigue can be reduced and power required by the mobile terminal 200 can be sufficiently obtained, in a case where the main power supply unit is installed at the neck band unit 210, rather than at the glass unit 230.

The glass unit 230 is electrically-connected to the neck band unit 210, so as to be supplied with power from the main power supply unit mounted in the neck band unit 210. Referring to FIG. 3, the glass unit 230 is provided with charging pins 234 at two ends thereof, and the neck band unit 210 is provided with charging terminals 214 in correspondence to the charging pins 234. The charging pins 234 may be formed at the frame 231, and the charging terminals 214 may be formed at the accommodation recesses 211. As shown in FIG. 4, once the frame 231 is inserted into the accommodation recesses 211, the charging pins 234 and the charging terminals 214 come in contact with each other. The structure and the arrangement of the charging pins 234 and the charging terminals 214 are not limited to the aforementioned ones. For instance, the charging pins 234 may be formed at the neck band unit 210, whereas the charging terminals 214 may be formed at the glass unit 230.

The connector 213 and the port 236 transmit data between the neck band unit 210 and the glass unit 230. On the contrary, the charging pins 234 and the charging terminals 214 supply power from the main power supply unit to an auxiliary power supply unit (not shown). However, the structure and arrangement are not limited to the aforementioned one, which may be implemented in reverse.

The glass unit 230 may be provided therein with an auxiliary power supply unit, so as to be operable even in a non-electrically connected state with the neck band unit 210. The auxiliary power supply unit is formed to have a smaller capacity than the main power supply unit. Once the neck band unit 210 and the glass unit 230 are coupled to each other, the auxiliary power supply unit may be charged with power supplied from the main power supply unit. Power supply may be performed through the charging pins 234 and the charging terminals 214.

The mobile terminal 200 according to the present invention has a structure to prevent fatigue from being concentrated on part of a user's body, when mounted on the user. More specifically, components of the mobile terminal 200 are mounted on the neck band unit 210 and the glass unit 230 in a balanced manner. For instance, the glass unit 230 may be provided with only a minimized number of components which enable the glass unit 230 to operate, whereas the neck band unit 210 may be provided with the rest components.

The frame 231, the input/output module 232, the camera module 233, the controller, and the auxiliary power supply unit are minimized components which enable the glass unit 230 to operate, independently from the neck band unit 210. Other components, which should be installed at the glass unit 230, may be added to the glass unit 230. The components which should be absolutely installed at the glass unit 230 include a bio sensor 235 such as a photoplethysmography sensor or an electrocardiogram sensor. The photoplethysmography sensor may include an infrared LED and a light receiving portion, and the electrocardiogram sensor may include an electrode. The bio sensor 235 is configured to sense a change of blood flow or micro electricity by contacting a user's skin, thereby sensing a bio-signal transmitted through the user's skin. In the present invention, a sensor installed at the glass unit 230 is not limited to such bio sensor, but may include all types of sensors.

Of the neck band unit 210 and the glass unit 230, the glass unit 230 comes in fixed-contact with a user's skin. More specifically, the frame 231 always comes in contact with a user's skin. The frame 231 is held on a user's ears, thereby fixedly-contacting the user's head. On the contrary, the neck band unit 210 does not fixedly-contact a user's skin. Thus, the bio sensor 235 should be installed at the glass unit 230.

However, most components of the mobile terminal 200 are installed at the neck band unit 210. For instance, the neck band unit 210 may be provided at least one of the microphone 215, the audio output module 216, an ear-jack socket (not shown), a main controller (not shown) and the wireless communication unit 110 (refer to FIG. 1).

The microphone 215 may include a first microphone 215 installed at one end of the neck band unit 210, and a second microphone 215 installed at another end of the neck band unit 210. The first microphone 215 and the second microphone 215 may interwork with each other so as to remove noise rather than a user's voice.

The audio output module 216 may include a loud speaker and a bone conduction speaker. The loud speaker may be installed at one side of the neck band unit 210, and the bone conduction speaker may be installed at another side of the neck band unit 210. The bone conduction speaker is configured to transmit a sound by vibration a skull. The bone conduction speaker may be formed to be withdrawable from the neck band unit 210.

The main controller may control entire functions of the mobile terminal 200, whereas the controller of the glass unit 230 is configured to control limited functions.

The wireless communication unit 110 may include a communication module such as Bluetooth and Wi-Fi.

Such components are not always installed at the glass unit 230. Preferably, all of the microphone 215, the speaker, the ear-jack socket, the main controller and the wireless communication unit 110 are provided at the neck band unit 210.

In a case where the glass unit 230 and the neck band unit 210 are connected to each other in a wireless manner, each of the glass unit 230 and the neck band unit 210 may include the wireless communication unit 110. The glass unit 230 and the neck band unit 210 may exchange data through the wireless communication units 110. By an electrical connection between the neck band unit 210 and the glass unit 230, functions utilizable by the glass unit 230 can be extended to functions of the neck band unit 210.

In the present invention, the glass unit 230, which has a smaller size and a lighter weight than a glass type terminal, can be implemented through a distributed arrangement of components. The glass unit 230 can operate independently from the neck band unit 210, using power supplied from the auxiliary power supply unit. In order to use the glass unit 230 for a long time, the auxiliary power supply unit is preferably charged with power supplied from the main power supply unit, because the auxiliary power supply unit has a smaller capacity than the main power supply unit.

The glass unit 230 is provided with a minimized number of components required to operate the glass unit 230, whereas the neck band unit 210 is provided with most components. Thus, functions executable in the glass unit 230 may be extended by an electrical connection between the glass unit 230 and the neck band unit 210. For instance, in a case where a speaker is installed only at the neck band unit 210, if the mobile terminal 200 has been set to use only the glass unit 230 independently from the neck band unit 210, a speaker function cannot be activated by the glass unit 230. However, if the glass unit 230 and the neck band unit 210 are electrically-connected to each other, the speaker function can be activated based on an input applied through the touch input unit 232b.

Hereinafter, the mobile terminal 200, which is worn on a user in a state the neck band unit 210 and the glass unit 230 have been coupled to or separated from each other, will be explained.

Figure 5A:
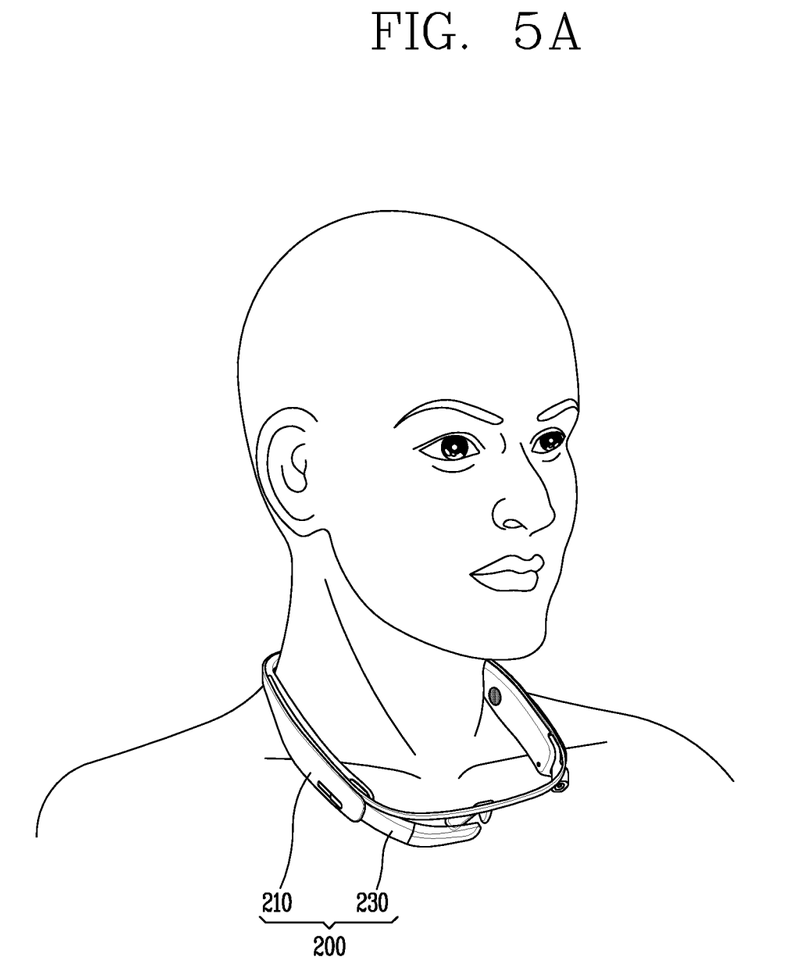
FIG. 5A is a conceptual view illustrating that the neck band unit and the glass unit have been worn on a user's neck in a coupled state.

FIG. 5A is a conceptual view illustrating that the neck band unit 210 and the glass unit 230 have been worn on a user's neck in a coupled state.

The neck band unit 210 and the glass unit 230 are coupled to each other, thereby forming an annular terminal body. As shown in FIG. 5A, the annular terminal body may be worn on a user's neck. While the glass unit 230 is not used, it can be stored in the neck band unit 210 worn on a user's neck, in a coupled manner. Thus, the glass unit 230 can be carried and stored, without an additional case for portability and storage.

Since the neck band unit 210 and the glass unit 230 form the annular terminal body, the mobile terminal 200 of the present invent invention can be safely stored, unless a coupled state between the neck band unit 210 and the glass unit 230 is released.

The mobile terminal 200 may further include elastic members for preventing loss of the mobile terminal 200. The elastic members are installed on inner circumferential surfaces of the accommodation recesses 211, and press the frame 231 in order to prevent the glass unit 230 from being arbitrarily separated from the accommodation recesses 211. Preferably, the elastic members may be installed on inner circumferential surfaces of the two accommodation recesses 211, thereby pressing the frame 231 at two sides. The glass unit 230 is not arbitrarily separated from the accommodation recesses 211 by the elastic members. Thus, loss of the mobile terminal 200 can be prevented.

Figure 5B:
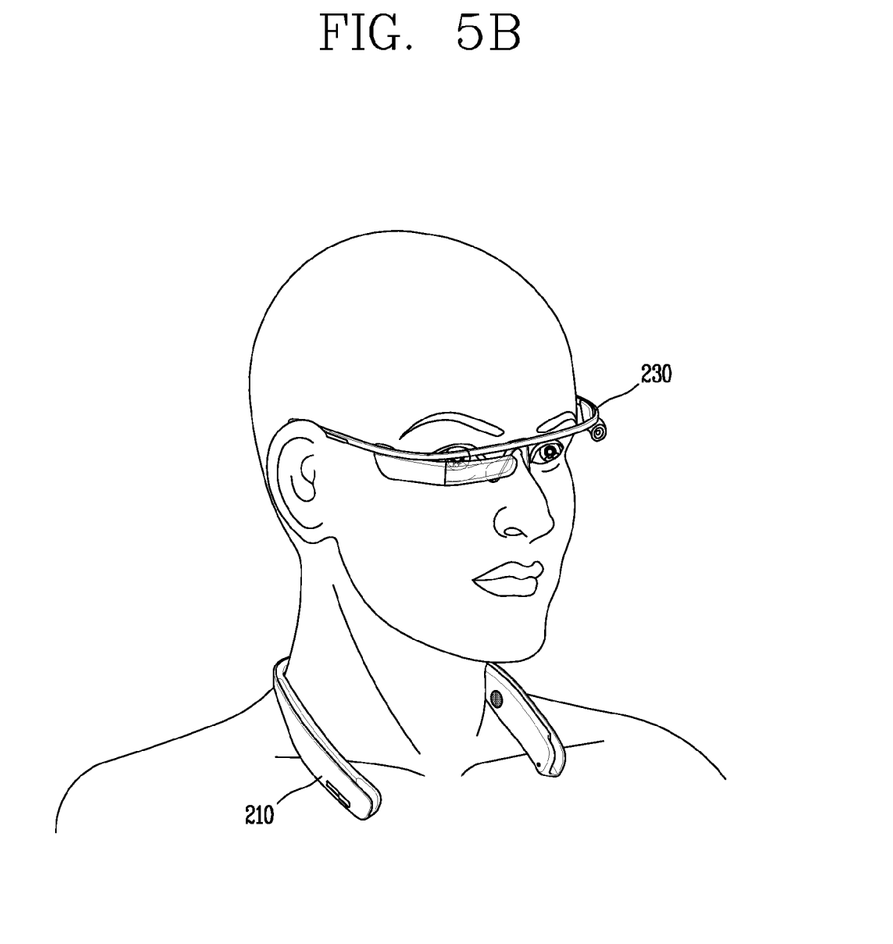
FIG. 5B is a conceptual view illustrating the neck band unit and the glass unit are used in a separate manner.

FIG. 5B is a conceptual view illustrating that the neck band unit 210 and the glass unit 230 of the mobile terminal 200 are used in a separate manner.

FIG. 5B illustrates a preferred usage state to be implemented in the present invention. The neck band unit 210 is worn on a neck, and the glass unit 230 is worn on a head.

The neck band unit 210 and the glass unit 230 are electrically-connected to each other by any method. For instance, the neck band unit 210 and the glass unit 230 may be wirelessly paired using Bluetooth.

As shown in FIG. 5A, when a user wishes to stop using the mobile terminal 200, the user may store the glass unit 230 in the neck band unit 210 in a coupled manner.

Figure 5C:
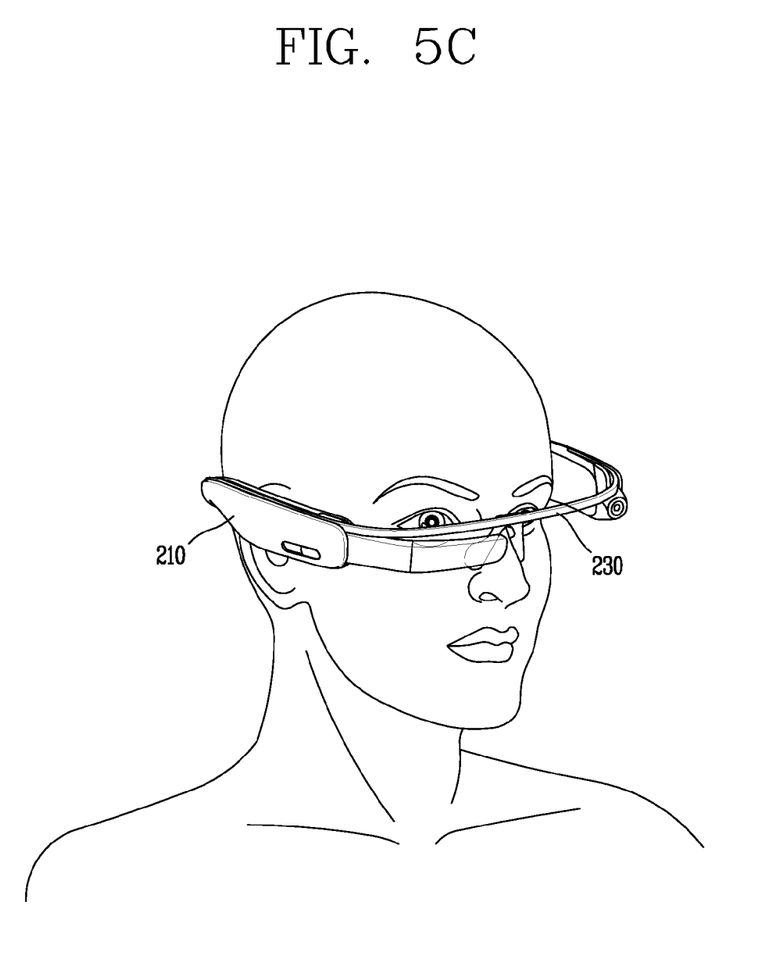
FIG. 5C is a conceptual view illustrating that the neck band unit and the glass unit have been worn on a user's head in a coupled state.

FIG. 5C is a conceptual view illustrating that the neck band unit 210 and the glass unit 230 have been worn on a user's head in a coupled state.

A user can wear the mobile terminal 200 in a state where the neck band unit 210 and the glass unit 230 have been coupled to each other. A user can wear an annular terminal body on a head in the form of a hair band. A length of the terminal body can be controlled in correspondence to a size of a user's neck or head.

Hereinafter, an electrical connection between the neck band unit 210 and the glass unit 230 will be explained.

Figure 6:
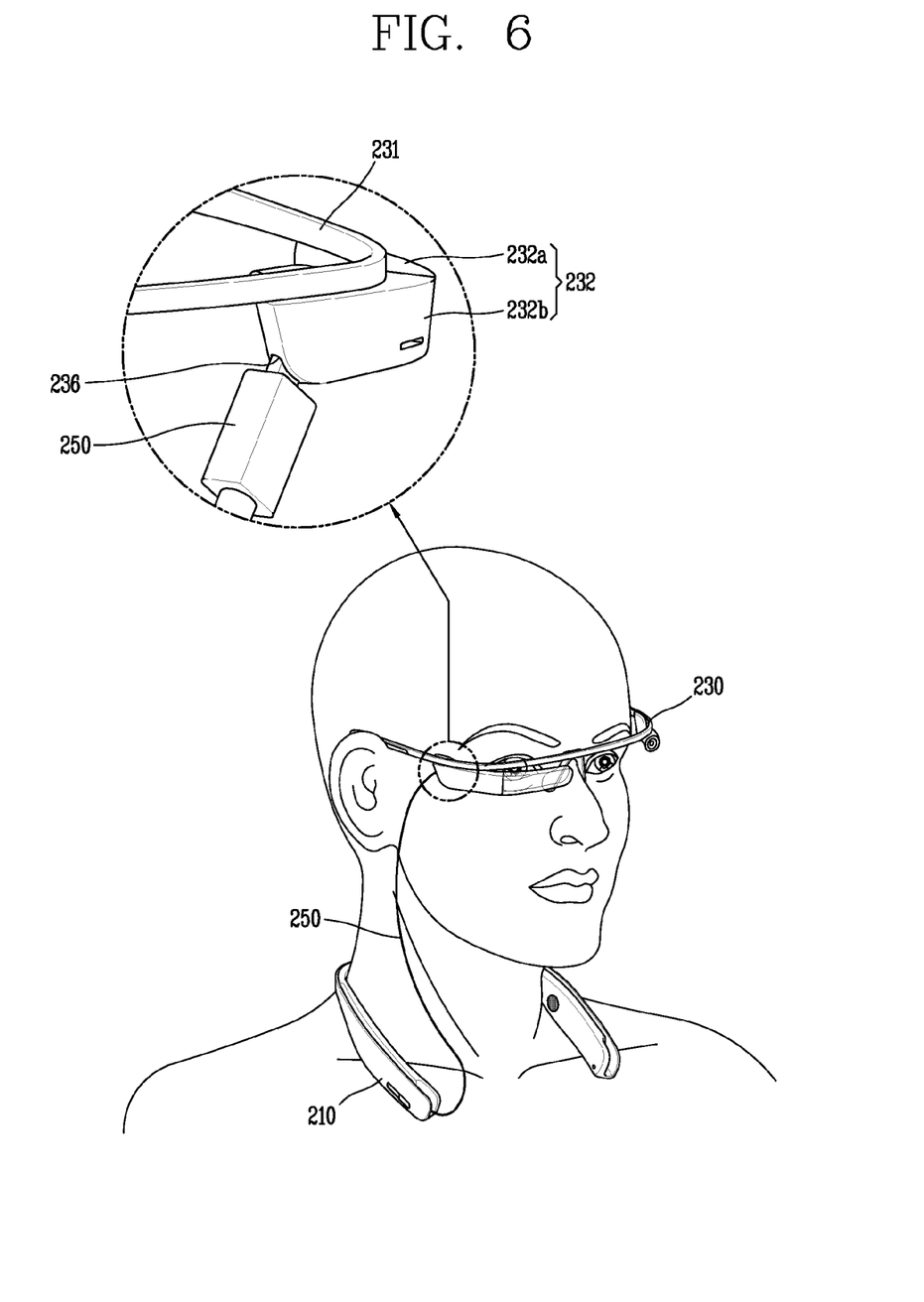
FIG. 6 is a conceptual view for explaining an electrical connection between the neck band unit and the glass unit.

FIG. 6 is a conceptual view for explaining an electrical connection between the neck band unit 210 and the glass unit 230.

The mobile terminal 200 may further include a cable 250 configured to connect the neck band unit 210 and the glass unit 230 to each other in a state where the neck band unit 210 and the glass unit 230 have been separated from each other. As shown in FIG. 6, the cable 250 may connect a connector 213 of the neck band unit 210 to a port 236 of the glass unit 230.

The cable 250 may supply power to the auxiliary power supply unit from the main power supply unit, and may transmit data between the neck band unit 210 and the glass unit 230.

Figure 7:
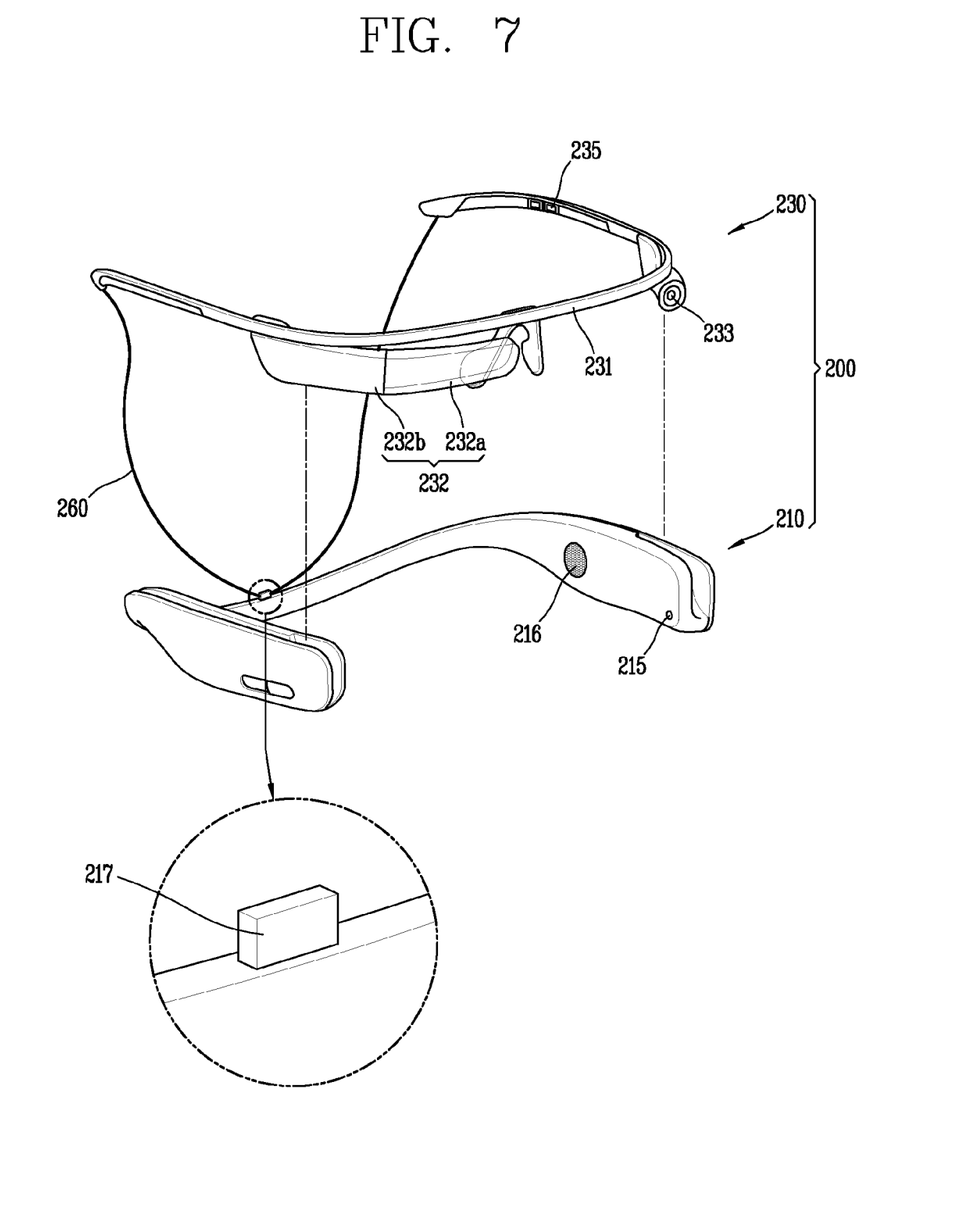
FIG. 7 is a conceptual view for explaining another electrical connection between the neck band unit and the glass unit.

FIG. 7 is a conceptual view for explaining another electrical connection between the neck band unit 210 and the glass unit 230.

The neck band unit 210 is provided with a connector 217 on an outer surface thereof, the outer surface arranged at a rear region of a neck when a user has worn the neck band unit 210. The glass unit 230 is provided, at two ends thereof, with terminal portions electrically-connected to the neck band unit 210 through the connector 217. The connector 217 is connected to the two terminal portions through a cable 260 branched into two parts from the connector 217 and extending toward the terminal portions.

As aforementioned, the cable 260 may supply power to the auxiliary power supply unit from the main power supply unit, and may transmit data between the neck band unit 210 and the glass unit 230.

Unlike the configuration aforementioned with reference to FIGS. 6 and 7, the neck band unit 210 and the glass unit 230 may be wirelessly connected to each other. Each of the neck band unit 210 and the glass unit 230 may include a wireless communication unit, and the wireless communication unit may adopt a Bluetooth method. However, a wireless communication method between the neck band unit 210 and the glass unit 230 is not limited to such Bluetooth method.

Hereinafter, a structure for charging the main power supply unit will be explained.

Figure 4:
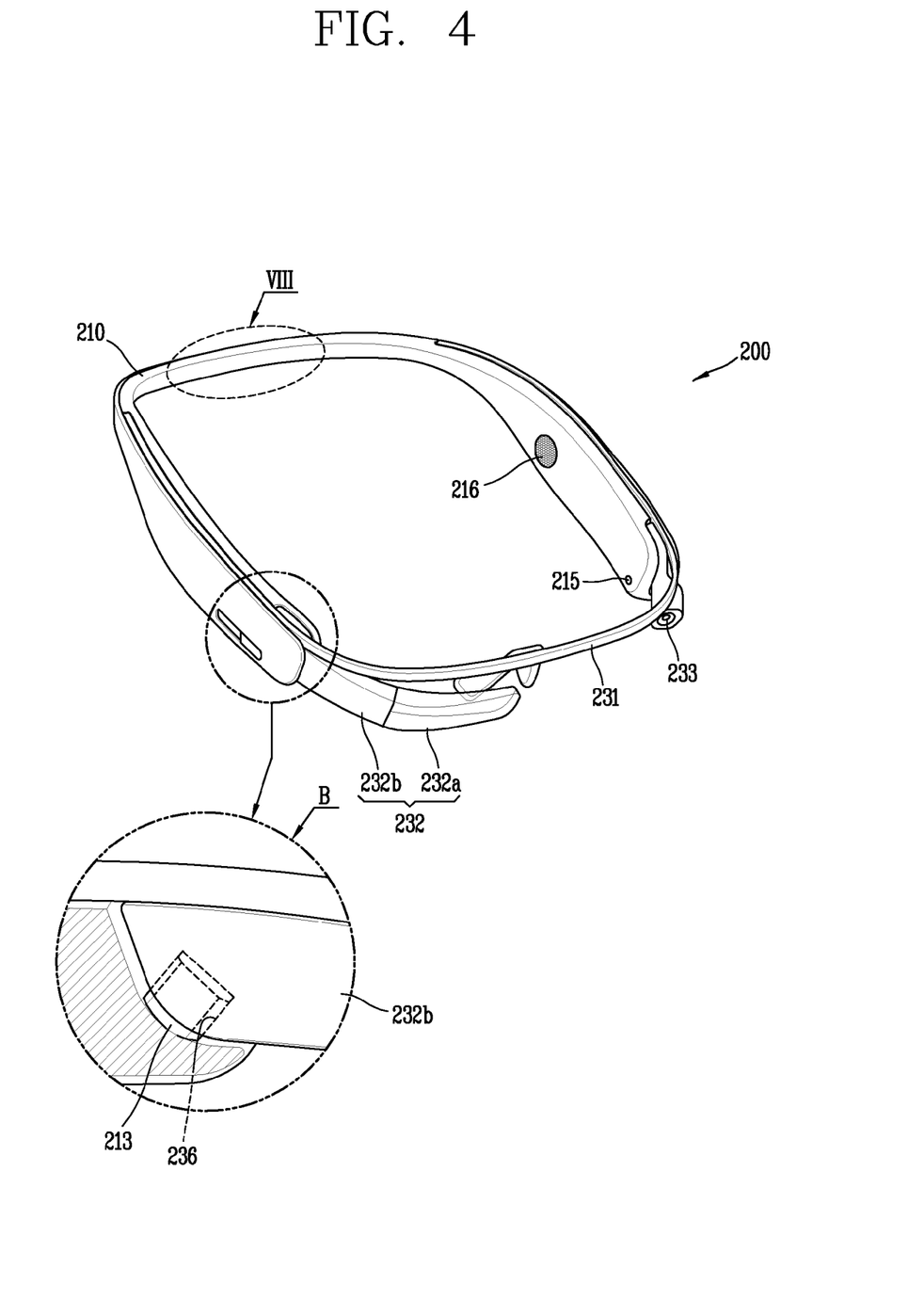
FIG. 4 is a perspective view of the mobile terminal of FIG. 2, which shows a coupled state between the neck band unit and the glass unit.
Figure 8A:
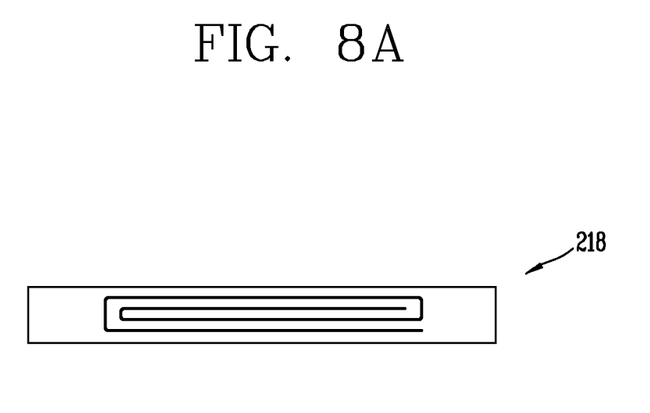
FIGS. 8A and 8B are conceptual views each illustrating an inner structure of part 'VIII' shown in FIG. 4.
Figure 8B:
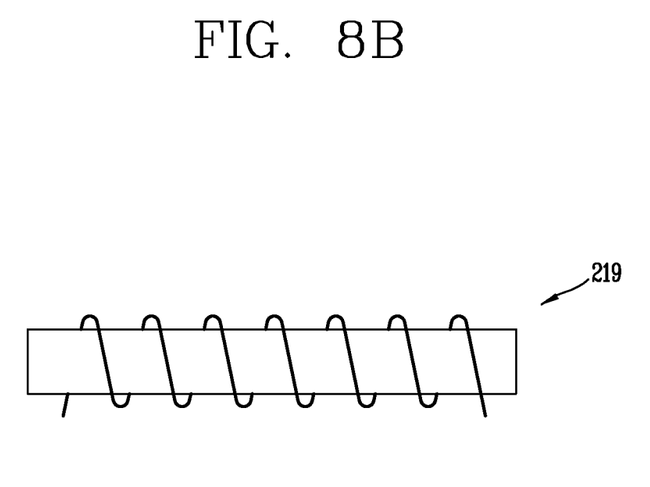

FIGS. 8A and 8B are conceptual views each illustrating an inner structure of part 'VIII' shown in FIG. 4.

The main power supply unit of the neck band unit 210 may be connected to a charger by wire through a charging port (not shown), thereby being provided with power. Alternatively, the main power supply unit may be wirelessly provided with power from a wireless charger.

FIGS. 8A and 8B are views for explaining a structure to receive power in a wireless manner. The neck band unit 210 may be provided therein with wireless charging coils 218 and 219 for charging the main power supply unit by wirelessly receiving power from an external wireless charger.

FIG. 8A illustrates a wireless charging coil 218 implemented using a flexible printed circuit board (FPBC). FIG. 8B illustrates a structure where a wireless charging coil 219 has been wound on a shaft disposed in the neck band unit 210. Each of the wireless charging coils 218 and 219 may operate by being electrically-connected to a main printed circuit board (not shown) formed in the neck band unit 210.

The present invention may have the following advantages.

Firstly, the neck band unit and the glass unit may be coupled to each other or separated from each other, by a user's selection. Further, components of the mobile terminal may be mounted to the neck band unit and the glass unit in a distributed manner. Thus, a weight of the mobile terminal can be distributed to the neck band unit and the glass unit, and the degree of fatigue applied to a user wearing the mobile terminal can be reduced. Further, once the glass unit and the neck band unit are electrically-connected to each other, functions of the glass unit may be extended.

Besides, the glass unit can be used independently by being separated from the neck band unit. Further, power required by the glass unit may be supplied from the neck band unit. As a result, shortage of power, a problem occurring from the conventional wearable device, can be solved.

Further, the mobile terminal of the present invention can be carried and stored without an additional case.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a neck band unit comprising a main power supply unit and shaped to be wearable around a user's neck in a separated configuration;
a frame configured to be wearable on a user's head in the separated configuration and configured to be coupled with the neck band unit when the mobile terminal is in a connected configuration;
an input/output module located at a portion of the frame; and
a camera module located at a portion of the frame,
wherein the neck band unit further comprises accommodation recesses, and at least a part of the accommodation recesses is shaped to correspond to a shape of a portion of the frame to facilitate coupling of the frame to the neck band unit in the connected configuration,
wherein the frame is electrically coupled to the neck band unit in the connected configuration and is electrically disconnected from the neck band unit in the separated configuration,
wherein when the mobile terminal is in the connected configuration, the main power supply unit provides power to the input/output module,
wherein the neck band unit and the frame are wearable on the user's neck or head when the mobile terminal is in the connected configuration,
wherein one of the frame and the neck band unit comprises charging pins, and the other one of the frame and the neck band unit comprises charging terminals that correspond to the charging pins,
wherein one of the charging pins and the charging terminal is disposed at the accommodation recesses, and the charging pins and the charging terminals come in contact with each other when the frame is inserted into the accommodation recesses such that the frame and the neck band unit are electrically connectable with each other without cords in the connected configuration,
wherein the neck band unit further comprises a first accommodation portion and a second accommodation portion each extending from a corresponding one of the accommodation recesses,
wherein at least part of the input/output module is inserted into the first accommodation portion, and at least part of the camera module is inserted into the second accommodation portion to be in the connected configuration, and
wherein the neck band unit further comprises a connector protruding from the first accommodation portion and the input/output module comprises a port corresponding to the connector such that the input/output module and the neck band unit are electrically connectable with each other without cords in the connected configuration.

2. The mobile terminal of claim 1, wherein the frame further comprises an auxiliary power supply unit such that the input/output module is operable in the separated configuration, and
wherein the auxiliary power supply unit is charged with power supplied from the main power supply unit during the connected configuration.

3. The mobile terminal of claim 1,
wherein the input/output module and the camera module are installed at generally opposite sides with respect to a central part of the frame such that a weight distribution of the frame is balanced between the input/output module and the camera module.

4. The mobile terminal of claim 1, further comprising a cable configured to connect the neck band unit and the frame to each other in the separated configuration.

5. The mobile terminal of claim 1, wherein the neck band unit further comprises a second connector to be positioned near a back portion of the user's neck when the neck band unit is worn on the user's neck,
wherein the frame further comprises terminal portions configured to be electrically connected to the neck band unit via the second connector, and
wherein the second connector is connectable to the terminal portions via a cable having two parts such that each of the two parts extends from the second connector toward a corresponding one of the terminal portions.

6. The mobile terminal of claim 1, wherein the neck band unit and the frame are connected to each other to form an annular terminal body.

7. The mobile terminal of claim 6, wherein the terminal body is wearable around the user's neck or head in the connected state.

8. The mobile terminal of claim 6, wherein a length of the terminal body is adjustable according to a size of the user's neck or head.

9. The mobile terminal of claim 1, wherein the accommodation recesses comprise elastic members on inner circumferential surfaces thereof, and the elastic members are configured to press the frame in order to prevent the frame from being arbitrarily separated from the accommodation recesses.

10. The mobile terminal of claim 1, wherein the neck band unit further comprises wireless charging coils configured to charge the main power supply unit by wirelessly receiving power from an external wireless charger.

11. The mobile terminal of claim 1, wherein the neck band unit further comprises a wireless communication unit configured to communicate with the frame or another terminal wirelessly.

12. The mobile terminal of claim 1, wherein the input/output module comprises:
a display positioned to be in front of the user's eye when the frame is worn on the user's head and configured to display visual information; and
a touch input unit positioned next to the display and configured to receive a touch input.

13. The mobile terminal of claim 1, wherein the frame further comprises a bio sensor located at a portion of the frame such that the bio sensor contacts the user's skin when the frame is worn on the user's neck or head, and
wherein the bio sensor is configured to sense the user's bio-signal.

14. The mobile terminal of claim 1, wherein the neck band unit further comprises at least a microphone, an audio output module, an ear-jack socket, or a wireless communication unit, and
wherein at least one function executable in the frame is also executable in the neck band unit.

15. The mobile terminal of claim 1, wherein the frame further comprises:
a first portion formed of a silicone material and configured to contact the user's skin when the frame is worn on the user's neck or head; and
a second portion formed of a metallic material and configured to function as an antenna.

16. The mobile terminal of claim 1, wherein the frame further comprises a right end portion and a left end portion such that each of the right end portion and the left end portion is inserted into a corresponding one of the accommodation recesses.

17. The mobile terminal of claim 1, wherein each of the neck band unit and the frame is configured to be operable independently without presence of the frame or neck band unit.

18. The mobile terminal of claim 1, wherein:
one side of the user's neck is not surrounded by the neck band unit having a U shape when the neck band unit is worn around the user's neck in the separated configuration;
the one side of the user's neck is surrounded by the frame when the neck band and the frame are worn on the user's neck in the connected configuration such that all sides of the user's neck is surrounded by the mobile terminal that is in the connected configuration; and
the mobile terminal in the connected configuration is wearable around the user's head as a hair band.

* * * * *